(12) United States Patent
Xiao et al.

(10) Patent No.: US 7,790,137 B2
(45) Date of Patent: Sep. 7, 2010

(54) METAL TELLURIDE NANOCRYSTALS AND SYNTHESIS THEREOF

(75) Inventors: Qiangfeng Xiao, New Orleans, LA (US); Yunfeng Lu, New Orleans, LA (US); Minjuan Zhang, Ann Arbor, MI (US)

(73) Assignees: Toyota Motor Engineering & Manufacturing North America, Inc., Erlanger, KY (US); The Administrators of the Tulane Educational Fund, New Orleans, LA (US)

( * ) Notice: Subject to any disclaimer, the term of this patent is extended or adjusted under 35 U.S.C. 154(b) by 541 days.

(21) Appl. No.: 11/464,265

(22) Filed: Aug. 14, 2006

(65) Prior Publication Data

US 2008/0036101 A1    Feb. 14, 2008

(51) Int. Cl.
  C01B 19/04    (2006.01)
(52) U.S. Cl. ...................................... 423/509; 423/508
(58) Field of Classification Search .................. 423/508, 423/509; 438/54; 136/201, 264; 257/103, 257/613, 614, E33.061; 210/729; 977/813, 977/814, 823
See application file for complete search history.

(56) References Cited

U.S. PATENT DOCUMENTS

| 3,023,081 | A | * | 2/1962 | Kulifay | ....................... 423/509 |
| 3,524,771 | A | * | 8/1970 | Green | ......................... 136/203 |
| 2005/0253095 | A1 | | 11/2005 | Chen | |
| 2006/0110313 | A1 | | 5/2006 | Cho et al. | |

OTHER PUBLICATIONS

Takahashi et al. "Electric and thermoelectric properties of electrodeposited bismuth telluride (Bi2Te3) films" Journal of Applied Physics (2004) 96, 10, pp. 5582-5587.*

A.M. Kapitonov et al., "Luminescence Properties of Thiol-Stabilized CdTe Nanocrystals," J. Phys. Chem. B, vol. 103, No. 46, 1999, pp. 10109-10113.

Yean Deng et al.; Organic-assisted growth of bismuth telluride nanocrystals; Chemical Physics Letters; (2003) pp. 410-415; Published by Elsevier Science B.V. doi: 10.10.1016/S0009-2614(03)00783-8.

* cited by examiner

*Primary Examiner*—Jerry Lorengo
*Assistant Examiner*—Heng M Chan
(74) *Attorney, Agent, or Firm*—Gifford, Krass, Sprinkle, Anderson & Citkowski, P.C.

(57) ABSTRACT

A process for synthesizing a metal telluride is provided that includes the dissolution of a metal precursor in a solvent containing a ligand to form a metal-ligand complex soluble in the solvent. The metal-ligand complex is then reacted with a telluride-containing reagent to form metal telluride domains having a mean linear dimension of from 2 to 40 nanometers. NaHTe represents a well-suited telluride reagent. A composition is provided that includes a plurality of metal telluride crystalline domains $$(PbTe)_{1-x-y}(SnTe)_x(Bi_2Te_3)_y \qquad (I)$$

having a mean linear dimension of from 2 to 40 nanometers inclusive where x is between 0 and 1 inclusive and y is between 0 and 1 inclusive with the proviso that x+y is less than or equal to 1. Each of the metal telluride crystalline domains has a surface passivated with a saccharide moiety or a polydentate carboxylate. A densified mass having a density of greater than 95% of the theoretical density includes a plurality of lead telluride, tin telluride, bismuth telluride, or a combination thereof of domains having a mean linear dimension of from 2 to 40 nanometers inclusive that have been subjected to hot isotactic pressing.

7 Claims, No Drawings

METAL TELLURIDE NANOCRYSTALS AND SYNTHESIS THEREOF

FIELD OF THE INVENTION

The present invention relates in general to metal telluride nanocrystals and in particular to synthesis of such nanocrystals via a solvent soluble metal-ligand complex.

BACKGROUND OF THE INVENTION

With the increasing global energy demand, development of devices that directly convert thermal energy into electricity, often termed thermoelectric devices, are receiving particular attention. Lead telluride and bismuth telluride are materials that have been well studied with regard to their thermoelectric properties, yet such materials have met with limited acceptance owing to problems associated with material synthesis. Theoretical calculations and molecular beam epitaxy investigations of these materials suggest that considerable improvements in thermoelectric properties for these materials can be achieved by the synthesis of such material having nanometer sized domains (1-6).

Conventional bulk lead telluride and bismuth telluride have been prepared through solid-state reactions at elevated temperatures, through pyrolysis of organometallic precursors, or through gas-phase reaction of metal atoms and hydrogen telluride. The lead telluride having nanometer size domains has been synthesized through solvothermal and organic-ligand-assisted methodologies (7-8). Unfortunately, existing methodologies for producing nanometer size domains of lead telluride are conducted at high temperature using toxic organic solvents and tend to produce material in low yields.

Thus, there exists a need for a synthetic procedure to produce nanocrystalline metal tellurides and in particular lead telluride and bismuth telluride by a process amenable to large scale production. Additionally, there exists a need for a densified metal telluride mass amenable for use within the context of a thermoelectric device.

SUMMARY OF THE INVENTION

A process for synthesizing a metal telluride is provided that includes the dissolution of a metal precursor in a solvent containing a ligand to form a metal-ligand complex soluble in the solvent. The metal-ligand complex is then reacted with a telluride-containing reagent to form metal telluride domains having a mean linear dimension of from 2 to 40 nanometers. NaHTe represents a well-suited telluride reagent. Nanorods are also formed under comparatively high reagent conditions and temperatures.

A composition is provided that includes a plurality of metal telluride crystalline domains $$(PbTe)_{1-x-y}(SnTe)_x(Bi_2Te_3)_y \qquad (I)$$

having a mean linear dimension of from 2 to 40 nanometers inclusive where x is between 0 and 1 inclusive and y is between 0 and 1 inclusive with the proviso that x+y is less than or equal to 1. Each of the metal telluride crystalline domains has a surface passivated with a saccharide moiety or a polydentate carboxylate. Nanorods are also synthesized.

A densified mass having a density of greater than 95% of the theoretical density includes a plurality of lead telluride, tin telluride, bismuth telluride, or a combination thereof of domains having a mean linear dimension of from 2 to 40 nanometers inclusive that have been subjected to hot isotactic pressing.

DETAILED DESCRIPTION OF THE PREFERRED EMBODIMENTS

The present invention has utility as a component of a thermoelectric device. A variety of metal tellurides are synthesized having nanocrystalline domains of a controlled size. The nanocrystals are readily prepared from a pure metal of lead, tin or bismuth, ternary or quaternary combinations thereof. Through the formation of a solvent soluble complex between the metal ion precursor and a ligand, and reagent concentration, a variety of sizes of nanocrystalline domains are readily produced at temperatures at which the solvent is a liquid especially including ambient room temperature of 20° Celsius.

The present invention addresses the problem associated with obtaining appreciable concentrations of metal ions, lead, tin, or bismuth in solution so as to be able to perform a classic two-reagent metathesis reaction with a telluride reagent. As a result nanocrystalline domains are produced of a material having the Formula I:

$$(PbTe)_{1-x-y}(SnTe)_x(Bi_2Te_3)_y \qquad (I)$$

where x and y each independently vary between 0 and 1 and x+y is less than or equal to 1. By varying the concentration of the metal ion complex in solution, the kinetics of particle growth was modified. In general, a lower concentration of metal ion complex tends to afford smaller average crystalline domains.

As used herein, the "mean linear dimension" of a crystalline domain is defined as a mean dimension for a group of nanocrystalline domains after having averaged the mutually orthogonal x-y-z linear extents for the domain. For a spherical crystalline domain, the x, y, and z domain dimensions are equivalent. Calculation of the mean linear domain for a group of spherical particles corresponds to the mean diameter for such domains.

As used herein, the x-y-z axes averaged aspect ratio of a domain is defined as the ratio of the longest linear axial extent of a domain divided by the shortest orthogonal axial linear extent of the domain. By way of example a rod-like cylindrical structure with a length of 40×diameter has an aspect ratio of 40.

Suitable metal ion precursors are selected to have at least slight solubility in the reaction solvent. Suitable metal ion precursors illustratively include halides such as chlorides, bromides, and iodides; hydroxides; nitrates; sulfates; acetates; chlorites; citrates; formates; isobutyrates; and dithionates.

Solvents suitable for forming the reaction:

$$nTe^{2-} + mM^{n+} \rightarrow M_mTe_n \qquad (II)$$

where n is 2 or 3, m is 2 or 3, such that n and m do not simultaneously equal 3, M is Pb, Sn, or Bi, preferably in water or an aqueous solution containing an organic cosolvent illustratively including $C_1$-$C_8$ alcohol, acetone, glycols, glymes, or combinations thereof. It is appreciated that the use of water as a solvent affords considerable environmental benefits and an organic cosolvent is optionally added in instances where such a solvent affords advantages as to reaction conditions such as concentration or operating temperature range, benefits as to metal telluride isolation, or the like. Optionally, the reaction (II) is performed in a neat organic solvent in instances where reagent precursors or metal ion complex provide synthetic advantage that compensates for additional effort associated with a neat organic solvent.

A metal telluride nanocrystalline material is produced according to the present invention through dissolution of a metal ion ligand in a solvent followed by dissolution of the metal ion precursor in the solution. Optionally, dissolution techniques such as heating, or application of ultrasonic energy to the solution are provided to facilitate metal ion dissolution and complex formation are optionally provided. pH modifying agents illustratively include alkali metal hydroxides and acids.

Ligands suitable for the formation of a soluble metal ion complex include monosaccharides such as glyceraldehyde, erythrose, threose, ribose, arabinose, xylose, glucose, fructose as representative aldohexoses, aldopentoses, ketohexoses and the like; glycosides such as β-glucopyranose and arbutin; disaccharides such as sucrose, maltose, and lactose; polysaccharides such as cyclodextrin, cellulose xanthate, and amylose. Nonsaccharide ligands operative herein also include polydentate chelating agents illustratively including ethylenediaminetetraacetic acid (EDTA), diethylenetriaminepentaacetic acid (DTPA), nitrilotriacetic acid (NTA), iminodiacetic acid (IDA), iminotriacetic acid (ITA), and their derivatives. Preferably, the metal ion and ligands are introduced such that there is a slight stoichiometric excess of binding ligand moieties needed to form a stable solvent soluble complex with the metal ion relative to the amount of metal ion $M^{n+}$ present. Preferably, when the metal ion is lead or tin, saccharide ligands are preferred. When the metal ion is bismuth, a polydentate carboxylate ligand is preferred.

Concentration of metal ions $M^{n+}$ in solution typically ranges from 0.001 to 2 molar. Preferably, the concentration of metal ions in solution to form a stable complex is between 0.05 and 1 molar.

Upon formation of a solution containing a metal-ligand complex, the complex is then reacted with a telluride reagent to form the inventive metal telluride domains having a mean linear dimension of from 2 to 40 nanometers. Reaction temperatures are preferably between 0° and 40° C., although other temperatures at which the solvent is in a liquid form are also operative herein. Sodium hydrogen telluride (NaHTe) represents a particularly preferred telluride reagent. Other telluride reagents include the sodium telluride and hydrogen telluride. Preferably, an aqueous solution containing telluride is added to the solution under an inert atmosphere with mechanical stirring or other agitation in stoichiometric amount relative to the complexed metal ion $M^{n+}$. An inventive composition containing metal telluride nanocrystalline domains is isolated by conventional techniques such as centrifugation or filtration. The resulting metal telluride nanocrystals are washed with various solvents are air stable at 20° Celsius. Analysis by x-ray diffraction and TEM reveals the nanocrystals to have a size distribution that tends to increase with mean linear dimension and an x-y-z axes averaged aspect ratio of between 1 and 1.2. Higher reagent concentrations and reaction temperatures are appreciated to yield nanocrystals having higher aspect ratios in excess of 10 and are described synonymously herein as nanorods.

A green body article is formed from a slurry in water or organic solvent of the metal telluride particles. Organic solvents operative herein illustratively include alkyl and aryl, where aryl solvents contain at least carbon atoms: $C_1$-$C_8$ alcohols, $C_2$-$C_8$ ethers, $C_2$-$C_{12}$ ketones or aldehydes, $C_3$-$C_{20}$ esters; heterocyclic solvents such as tetrahydrofuran and pyridine. The metal telluride content of the slurry is typically from 20 to 80 total slurry weight percent and preferably from 30 to 60 total slurry weight percent. Optionally, suitable fugitive binder is added to the slurry. A fugitive binder is defined as a binder or the decomposition products thereof that is removed during sintering to greater than 99 weight percent of the binder present. Fugitive binders illustratively include polyvinylpyrrolidones, polyvinyl alcohol, polyacrylates, latexes, and mineral oil. A preferred binder is polyvinyl alcohol. Binders are typically present from 0 to 5 total slurry weight percent for press molding or slip casting, while tape casting binders are typically present from 5 to 40 total slurry weight percent. It is appreciated that slurry formation is promoted by sonication, especially in instances where optional additives are provided.

Optionally, a dispersant is also added to the slurry. Dispersants operative herein illustratively include surfactants, with the nature of the surfactant as to nonionic, cationic, or anionic and the hydrophilic-lipophilic balance (HLB) thereof being dictated by factors including the zeta potential of the precursor composition particles, and the nature of the slurry solvent. Water represents a preferred slurry solvent. Ammonium polymethacrylate, fructose, and polyoxyethylene glycol are representative specific dispersants. A dispersant is typically present from 0 to 4 total slurry weight percent. Preferably, a dispersant is selected to improve solid loading for dispersed precursor composition particles. Other conventional additives to a slurry include a thixotrope.

The slurry of metal telluride particles are preferably filtered through a sieve or other filter media prior to formation of a green body to remove spurious contaminants and excessively large agglomerates of metal telluride that might operate to lessen purity and/or grain density of a resulting article.

An inventive article is formed from a slurry by conventional techniques illustratively including dry pressing, slip casting, and tape casting. For dry pressing, it is appreciated that slurries are preferably subjected to granulation to form a pre-consolidated powder. It is appreciated that in instances where an article is tape cast, that an extrudable tape casting binder is present in a quantity sufficient to allow convenient tape formation. Slip casting and tape casting are appreciated to be article formation techniques well suited for the creation of complex forms and shapes that are especially difficult to form from conventional single crystal metal telluride. Optionally, cold isostatic pressing is employed to facilitate dimensionally uniform grain body densification. Typical cold isostatic pressing conditions include exertion of 300 megapascals for 20 minutes.

Sintering of nanocrystalline metal telluride composition yields an inventive densified metal telluride article having a density of more than 95% of the theoretical density. It is appreciated that grain size growth is associated with sintering and the resultant article may no longer have discernable domains as measured by X-ray diffraction that have a mean linear dimension of between 2 and 40 nanometers. Sintering accomplishes the purpose of binder and other additive burnout, typically at temperatures up to about 500° C., followed by elevated temperature sintering.

Optionally, hot isostatic pressing to facilitate densification is performed during, or subsequent to sintering. Preferably, sintering occurs under vacuum. Typical pressures for vacuum sintering are below 1 torr. Preferably, vacuum sintering pressures are below $10^{-3}$ torr with pressures of between $10^{-5}$ and $10^{-6}$ torr being more preferable. Preferably, vacuum sintering occurs at more than 200° C. for a duration of 1 to 6 hours. More preferably, vacuum sintering occurs for this time duration between 200° C. and 600° C. in order to lessen the inclusions. It is noted that the grain size of the sintered article tends to increase as the precursors composition calcinations temperature increase.

The present invention is further detailed with respect to the following non-limiting examples.

EXAMPLE 1

Synthesis of NaHTe

NaHTe is typically synthesized by reacting $NaBH_4$ with excess amount of Te powder in water at 0° C. for 8 hours, resulting in the formation of red color NaHTe solution. The precipitation (excess Te) is removed. The NaHTe solution is stable and can be stored at a freezer for later use.

EXAMPLE 2

Synthesis of Lead-Glucose Complex Precursor

Precursor solution is prepared by mixing 1.655 g $Pb(NO_3)_2$ with 1 g of glucose and 2 g KOH in 10 ml water under ultrasonication at room temperature until the solution becomes transparent.

EXAMPLE 3

Lead-Sucrose Complex Precursor

The procedure of Example 2 is repeated with the replacement of glucose for an equivalent weight of sucrose to yield a comparable solution.

EXAMPLE 4

Lead-β-Cyclodextrin Complex Precursor

The procedure of Example 2 is repeated with the replacement of glucose for an equivalent weight of β-cyclodextrin to yield a comparable solution.

EXAMPLE 5

Bismuth-EDTA Complex Precursor

A precursor solution is prepared by mixing 2.425 g of bismuth nitrate hexahydrate into 10 ml of 28% ammonium hydroxide solution containing 2 g of EDTA (ethylene diamine tetraacetic acid-sodium salt) under reflux until a clear solution results.

EXAMPLE 6

Tin-Glucose Complex Precursor

The synthesis of Example 2 is repeated with the substitution of an equimolar quantity of tin nitrate for lead nitrate to yield a similar clear solution.

EXAMPLE 7

Synthesis of PbTe Nanocrystals

PbTe nanoparticles are prepared by adding the equal molar ratios of NaHTe solution dropwise of Example 1 to the Pb precursor solution of Example 2 and stirring 2 hours at room temperature under the nitrogen. A black precipitate is recovered by centrifugation and washed with ethanol and water. The nanocrystals are then dried in air. Polycrystalline particles having a mean linear dimension of between 15 and 30 nm are achieved. Generally spherical nanocrystals are noted.

EXAMPLE 8

Synthesis of PbTe Nanocrystals

The process of Example 7 is repeated with the use of the lead-beta-cyclodextrin complex precursor of Example 4 in place of the precursor solution of Example 2 used in the synthesis of Example 7. Polycrystalline particles having a mean linear dimension of between 15 and 30 nm are achieved. No impurity phase is observed by XRD. As with nanocrystals produced according to Example 7, the domains are generally spherical in shape.

EXAMPLE 9

Synthesis of Smaller Size Lead Telluride Nanocrystals

The synthesis of Example 8 is repeated with a lead-β-cyclodextrin complex precursor solution being diluted to 50 ml with water prior to dropwise addition of the NaHTe solution of Example 1 thereto. Considerably broader diffraction pattern peaks are noted that fit through a Debye-Scherer line broadening particle domain size of between 3 and 4 nm. This sizing is consistent with micrograph image particle size analysis.

EXAMPLE 10

Synthesis of Mixed Lead Tin Telluride Nanocrystals

The synthesis of Example 7 is repeated using only 5 ml of the lead-glucose complex precursor of Example 2 and 5 ml of the tin-glucose complex precursor of Example 7. XRD and TEM data from a resulting collection of nanocrystals was consistent with a 20 nm $Pb_{0.5}Sn_{0.5}Te$.

EXAMPLE 11

Synthesis of Bismuth Telluride Nanocrystals

A bismuth-EDTA complex is obtained by reacting 2.425 g of bismuth nitrate hexahydrate with 2 g of EDTA, 1 g thiosalicylic acid and 15 ml of ammonia water. To the resulting solution 3 ml of NaHTe solution of Example 1 is added dropwise into the solution and stirred for 2 hours under nitrogen. No impurity phase is noted in the diffraction pattern.

EXAMPLE 12

Alternative Synthesis of Bismuth Telluride Nanocrystals 5 ml of a 0.5 M NaHTe solution of Example 1 is added dropwise to the solution of Example 5 under nitrogen with stirring at 20° C. Black precipitates are isolated by centrifugation and purified by three cycles of centrifugation/washing/redispersion in water then in alcohol.

EXAMPLE 13-18

Second Alternate Synthesis of Bismuth Telluride Nanocrystals

The synthesis of Example 12 is repeated with an equimolar amount of diluted reagents with average particle size remaining about 20 nanometers and comparable morphology being observed as follows with the exception of Example 18 in which nanorod formation is noted.

| Example | Bi-EDTA (M) | NaHTe (M) | T (° C.) | Characterization |
|---------|-------------|-----------|----------|------------------|
| 13 | 0.05 | 0.06 | 20° C. | FIG. 5a |
| 14 | 0.05 | 0.06 | 100° C. | FIG. 5b |
| 15 | 0.05 | 0.015 | 20° C. | FIG. 5c |
| 16 | 0.05 | 0.015 | 100° C. | FIG. 5d |
| 17 | 0.5 | 0.06 | 20° C. | FIG. 5e |
| 18 | 0.5 | 0.06 | 100° C. | FIG. 5f |

REFERENCES CITED

1. Lu, W. G.; Fang, J. Y.; Stokes, K. L.; Lin, J., *J. Am. Chem. Soc.* 2004, 126, 11798.
2. Hicks, L. D.; Dresselhaus, M. S., *Phys. Rev. B,* 1993, 47, 12727-12731.
3. Hicks, L. D.; Dresselhaus, M. S., *Phys. Rev. B,* 1993, 47, 16631-16634.
4. Harman, T. C.; Taylor, P. J.; Spears, D. L.; Walsh, M. P. J., *Electron. Mater.,* 2000, 29, L1-L4.
5. Hicks, L. D.; Harman, T, C.; Sun, X.; Dresselhaus, M. S., *Phys. Rev. B,* 1996, 53, R10493-R10496.
6. Chen G.; Dresselhaus M. S.; Fleurial J.-P.; Caillat T., *Int. Mater. Rev.,* 2003, 48, 1.
7. Chi J. L., *Mater Lett.,* 2004, 58, 3222.
8. Lee, S.-M.; Jun, Y.-w.; Cho, S.-N.; Cheon, J., *J. Am. Chem. Soc.,* 2002, 124, 11244-11245.

Patent documents and publications mentioned in the specification are indicative of the levels of those skilled in the art to which the invention pertains. These documents and publications are incorporated herein by reference to the same extent as if each individual document or publication was specifically and individually incorporated herein by reference.

The foregoing description is illustrative of particular embodiments of the invention, but is not meant to be a limitation upon the practice thereof. The following claims, including all equivalents thereof, are intended to define the scope of the invention.

The invention claimed is:

1. A process for synthesizing a metal telluride comprising:
dissolving a metal precursor in a solvent containing a ligand to form a metal-ligand complex in a solution, said metal precursor containing a metal ion selected from the group consisting of: lead, tin and bismuth; and
reacting said metal-ligand complex in said solution with a telluride source and forming metal telluride nanoparticles, wherein the metal telluride nanoparticles have a composition of $$(PbTe)_{1-x-y}(SnTe)_x(Bi_2Te_3)_y,$$

where x is between 0 and 1 inclusive and y is between 0 and 1 inclusive with the proviso that x+y is less than or equal to 1; the nanoparticles having a mean linear dimension of from 2 to 40 nanometers, inclusive, and providing the metal telluride with improved thermoelectric properties.

2. The process of claim 1 wherein said metal precursor is a metal nitrate.

3. The process of claim 1 wherein said ligand is a saccharide and said metal precursor is at least one of a lead salt and a tin salt.

4. The process of claim 1 wherein said solvent is water.

5. The process of claim 1 wherein said source of telluride is NaHTe.

6. The process of claim 1 wherein reacting said metal-ligand complex with said telluride source occurs at a temperature between 0° and 100° Celsius.

7. The process of claim 1 wherein said ligand is a polydentate carboxylate and said metal precursor is a bismuth salt.

* * * * *